United States Patent [19]

Petzold, Rainer

[11] Patent Number: 5,012,418
[45] Date of Patent: Apr. 30, 1991

[54] VEHICLE OPERATING AND SPEED REGULATING DEVICE

[75] Inventor: Petzold, Rainer, Friedrichshafen, Fed. Rep. of Germany

[73] Assignee: Zahnradfabrik Friedrichshafen, AG., Friedrichshafen, Fed. Rep. of Germany

[21] Appl. No.: 273,038
[22] PCT Filed: Mar. 20, 1987
[86] PCT No.: PCT/EP87/00159
  § 371 Date: Aug. 18, 1988
  § 102(e) Date: Aug. 18, 1988
[87] PCT Pub. No.: WO87/05867
  PCT Pub. Date: Oct. 8, 1987

[30] Foreign Application Priority Data

Mar. 27, 1986 [WO] PCT Int'l Appl. ............... PCT/EP86/00185

[51] Int. Cl.⁵ ............... B60K 41/08; B60K 41/28; G05D 13/66
[52] U.S. Cl. ............... 364/426.04; 364/424.1; 364/431.01
[58] Field of Search ............... 364/424.1, 431.07, 442, 364/426.04; 180/176, 178, 179

[56] References Cited

U.S. PATENT DOCUMENTS

| 4,263,997 | 4/1981 | Poore | 192/0.033 X |
|---|---|---|---|
| 4,408,293 | 10/1983 | Avins | 364/424.1 X |
| 4,463,427 | 7/1984 | Bonnetain et al. | 364/424.1 X |
| 4,539,868 | 9/1985 | Habu | 364/424.1 X |
| 4,541,052 | 9/1985 | Mc Culloch | 364/424.1 X |
| 4,559,599 | 12/1985 | Habu et al. | 364/424.1 |
| 4,615,409 | 10/1986 | Kuml/u/ pper et al. | 180/176 |
| 4,740,898 | 4/1988 | Mc Kee et al. | 364/424.1 X |

FOREIGN PATENT DOCUMENTS

| 2829894 | 1/1980 | Fed. Rep. of Germany | 364/426.02 |
|---|---|---|---|
| 3523352 | 1/1986 | Fed. Rep. of Germany | . |
| 3506363 | 2/1986 | Fed. Rep. of Germany | . |
| 2557041 | 6/1985 | France | . |

OTHER PUBLICATIONS

Lorenz, K. et al., Application of the 4 HP 22 Four-Speed Automatic Transmission with Electronic/Hydraulic Control, ATZ Automobiltechnische Zeitschrift, 1983, No. 6, pp. 401–405.

Primary Examiner—Felix D. Gruber
Attorney, Agent, or Firm—Albert M. Zalkind

[57] ABSTRACT

A vehicle operating and speed-regulating system for a motor vehicle having a transmission and an engine accelerated and decelerated under control of gas and brake pedals, wherein vehicle speed is maintained at a constant value preset by actuation of one of the pedals just before both pedals are released. The constant speed maintaining action of the system is effected by regulating both shifting of the transmission and optimized operation of the engine pursuant to calculations made to attain driving conditions in accordance with diagrammed characteristics of the engine.

7 Claims, 3 Drawing Sheets

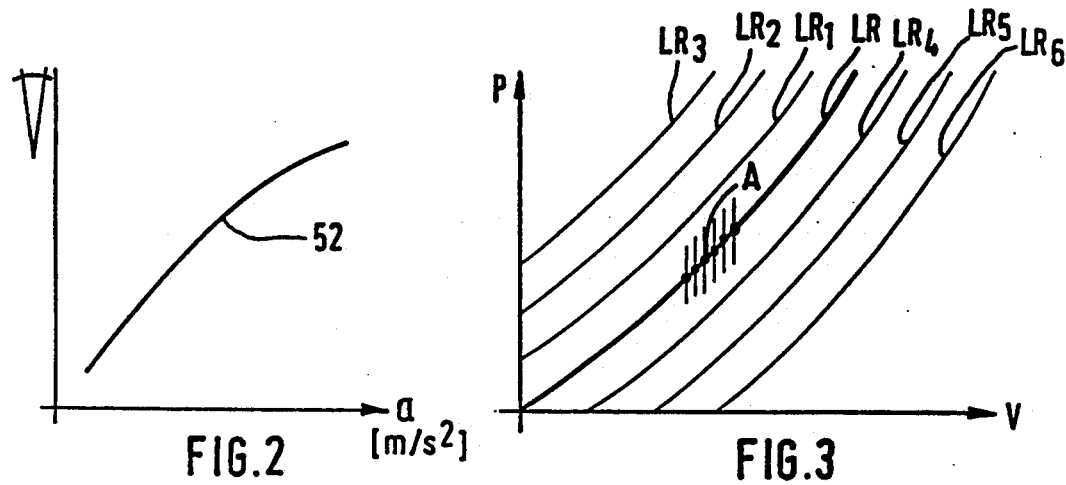
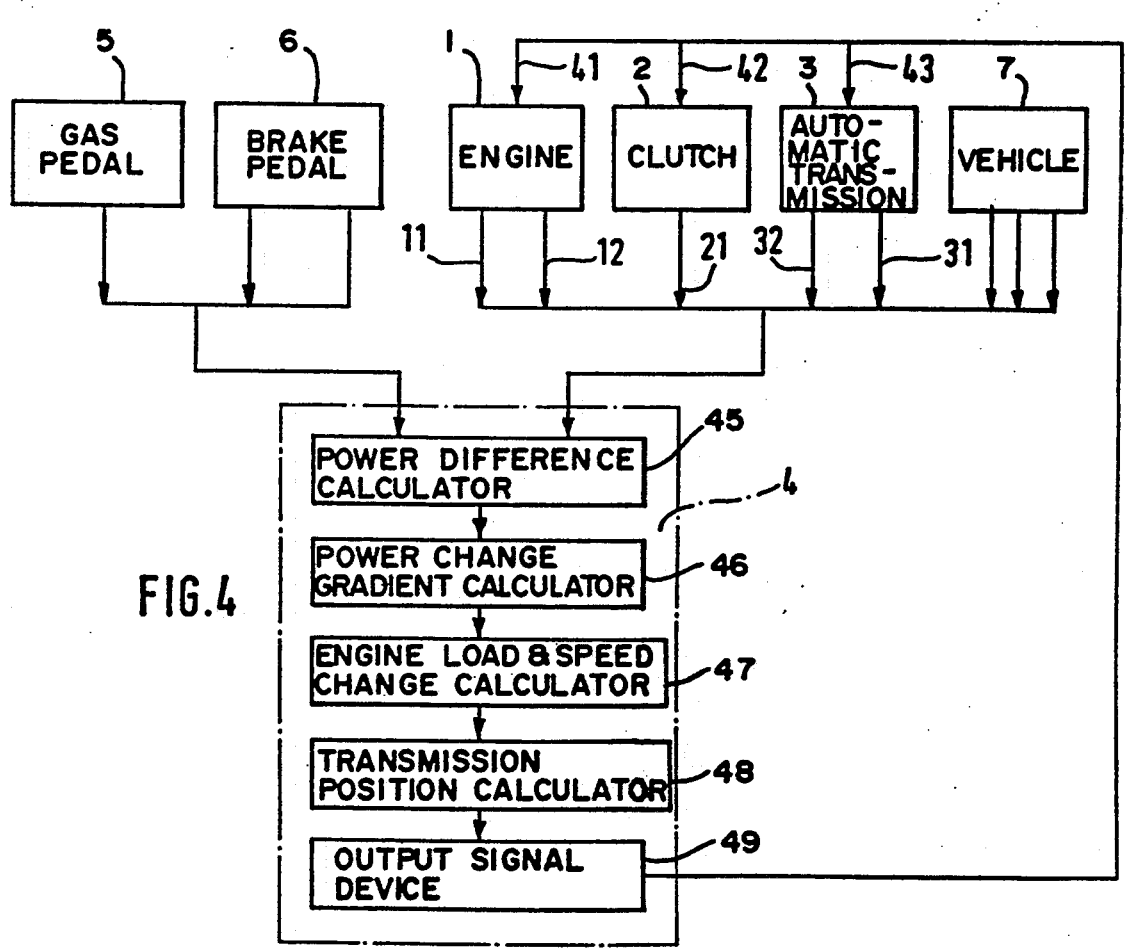

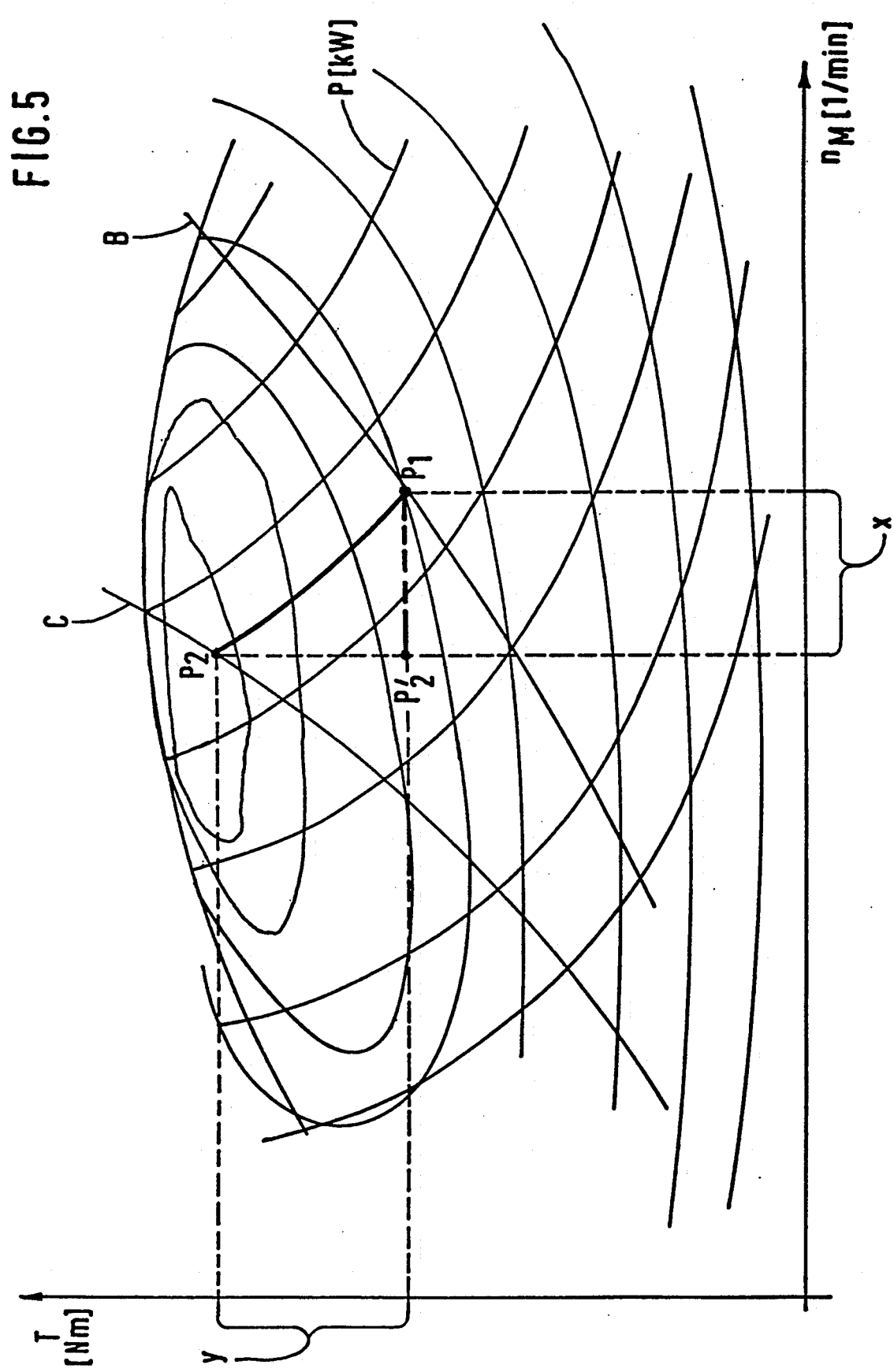

VEHICLE OPERATING AND SPEED REGULATING DEVICE

BACKGROUND OF THE INVENTION

This invention relates to a vehicle operating and speed regulating device.

BRIEF DESCRIPTION OF THE PRIOR ART

Operating a vehicle with an automatic transmission in the drive path by means of a gear shift lever and a gas pedal, where the drive ratio of the engine is regulated by the driver by means of the known gas pedal according to the desired driving speed and the running resistances—for example, ascending gradients, descending gradients and air resistance depending upon driving speed—is known. In that situation, the transmission is shifted according to relatively roughly differentiated load-controlled shift points in accordance with the engine's characteristic diagram as shown in ATZ 85 (1983) 6 from page 401.

Influencing the engine through a speed regulator so that the vehicle travels at a nearly constant speed without actuation of the gas pedal, with the transmission also being involved in the adjustment to the preset speed through another electronic device, is also known.

And finally, along with the actuation of the speed regulator by a first activating key after the interruption of this device by activation of the brake pedal, attaining the previously set vehicle speed again by a second activating key without activating the gas pedal is known from DE-OS 35 06 363.

When that is the situation, the previous driving speed is desired and attained, in a preprogrammed acceleration, when the engine power and the running resistances present—ascending gradients, for example—permit it.

Such devices improve the operation of a motor vehicle and can lead to a consumption-oriented way of driving in constant travel and during acceleration. But the overall effect is relatively slight since this device is seldom used because of the additional control that is required. Manipulation is also necessary and complicated, so that use is almost exclusively in very quiet traffic situations.

Therefore, it is the object of the invention to further develop a vehicle operating and speed regulating device so that an electronic controlling and regulating device influences engine and transmission operation more advantageously and further relieves the driver in the task of operating the vehicle.

SUMMARY OF THE INVENTION

The reduction of vehicle operation to an acceleration pedal and deceleration pedal, both of which work on an electronic controlling and regulating device, not only simplifies operation but also makes the application of an optimal adjustment of engine, transmission and vehicle performance possible under all driving conditions. In that situation, the electronic controlling and regulating device comprises a common device for influencing the engine, keeping speed constant, controlling transmission and clutch operation and interlinked individual control mechanisms for the main function, as is known from DE-OS 35 06 363. By the combination of the acceleration and deceleration pedals with the electronic controlling and regulating device and as a result of expansion of the influence of the engine and transmission in combination with the simple operation, the desired driving conditions can be linked much more optimally with the engine and transmission characteristics.

No driver is able to actuate a gas pedal so that the engine is always operated in the optimum of the characteristic diagram. In known automatic transmissions, the shift points or shift cycles are preset for the transmission, depending upon the gas pedal's position, by an electronic control mechanism, so that a high pendulum dynamic is also followed by a high shift point change. With the present invention, the driver only continues to choose the driving condition and not the engine load and the transmission condition. Instead, the electronic controlling and regulating device registers the desired driving conditions that are fed in by the driver through the acceleration and deceleration pedals and selects engine load and transmission multiplication according to a preset strategy, for example fuel consumption, whereby considerably greater shares of the driving are obtained in the optimal operating range of the engine. Changing the running resistances at a constant speed is also managed considerably more sensitively by a sequence of automatic operations in the electronic controlling and regulating device than by a driver. This system also offers a higher degree of safety because the driver can reduce his reaction time before preventive braking, even at constant speed.

All of the advantages of the system can only be fully used with an automatically shifting transmission. But simple advantages also emerge with a semiautomatic transmission, or even with a transmission that fundamentally is shifted by hand. The conclusions of the electronic controlling and regulating device are passed on to the driver optically or acoustically in the form of recommendations such as high or reverse gear requests. However, the fully-automatic layout is faster and simpler for the driver because the desired driving condition is continually compared with the actual condition in the drive path. The most favorable engine speed in combination with the most favorable gear can be selected immediately if the gradients are not in accordance with the change in power and a function of the programmed driving strategy, and is given to the actuation devices in the engine and transmission to be put into execution. This process makes it possible to continuously seek the optimum program of work between engine and transmission which cannot be achieved when the drive does the gear shifting.

The electronic controlling and regulating device is easily adaptable to various requirements in a relatively simple manner with suitable programming without any change in the handling by the driver. Another favorable adaptation can be achieved by the freely programmable acceleration requirement in combination with the actuation of the acceleration pedal. The functions triggered by the actuation of the deceleration pedal result in further simplifications of operation because several logically connected functions are put into execution by only one operating device. Through timing elements in the electronic controlling and regulating device, especially in connection with the actuation of the deceleration pedal, all desired functions can be obtained as a function of the operating dynamic. Moreover, free-wheeling can be triggered in addition to or in combination with the actuation of the acceleration pedal because, for example, the latter is desired in downhill travel in combination with a desired vehicle speed, where the constant speed can be of subordinate importance in such a driving situation.

FURTHER DESCRIPTION OF THE FIGURES

Further details of the invention will be explained in the light of the accompanying drawing, in which:

FIG. 2 shows a control curve of the acceleration as a function of the actuation angle on the acceleration pedal;

FIG. 3 shows a running resistance representation in several running resistance curves;

FIG. 4 shows a rough process in a vehicle operating and speed regulating device; and FIG. 5 shows a performance charactertistic diagram.

DETAILED DESCRIPTION

Figure 1:
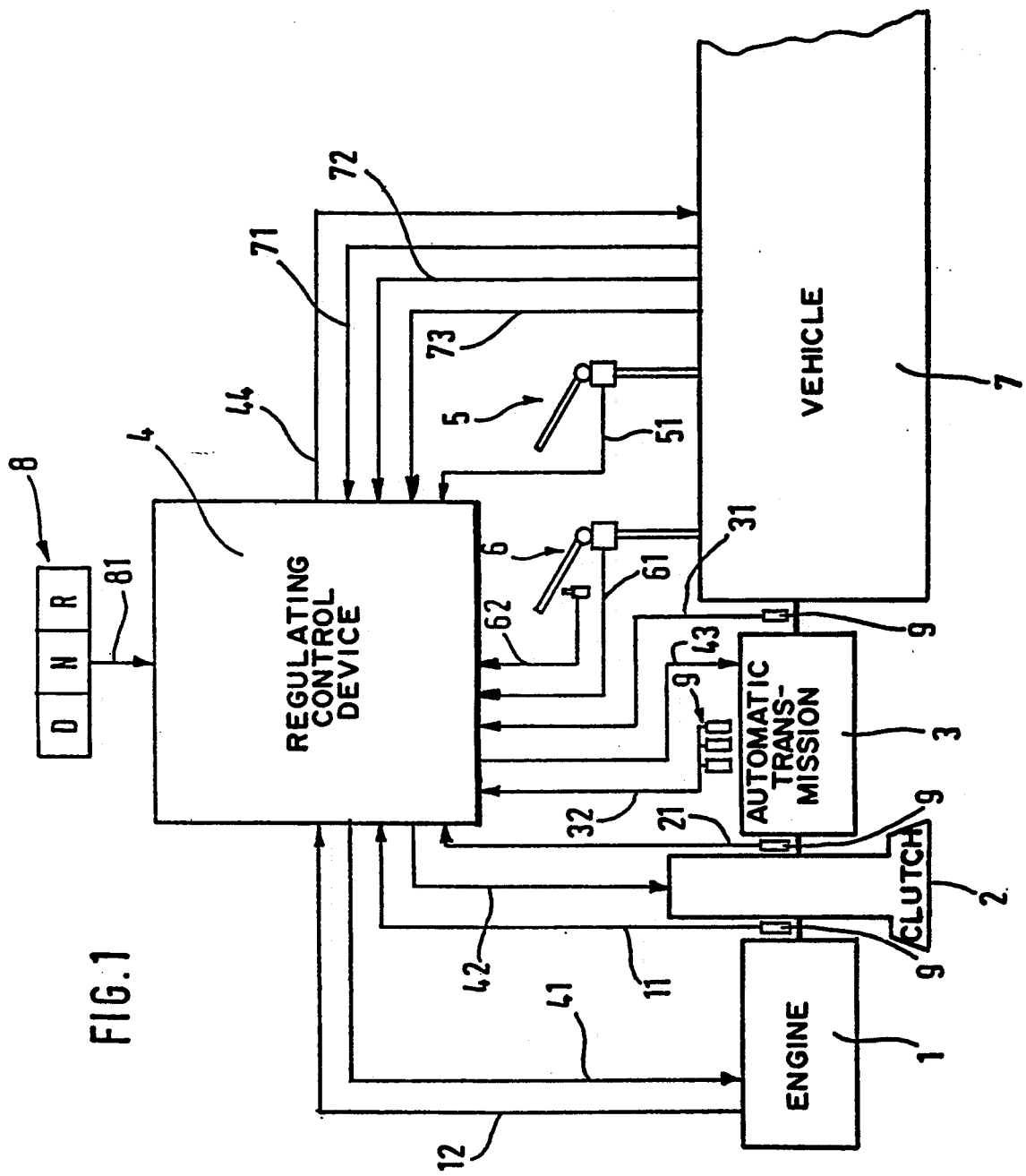
FIG. 1 shows a block connection diagram of the vehicle operating and speed regulating device.

In the block connection diagram of the vehicle operating and speed regulating device according to FIG. 1, an engine 1, a clutch 2 and an automatic transmission 3 are provided where the automatic transmission and the clutch can be designed as a planetary gear system with a bridgeable torque transformer as a clutch, as is known, or as an automated gear reducer transmission with a separately-disposed automated dry or wet clutch, for example. The electric controlling and regulating device 4 is connected with the engine 1, with the clutch 2, and with the transmission 3 by control cables 41, 42, 43 to influence it. The engine speed, the transmission-input revolutions per minute and the clutch-output revolutions per minute and the transmission output speed, as well as the transmission position are supplied to the electronic controlling and regulating device 4 through suitable sensors or servo units 9 through leads 11, 21, 31 and 32. Furthermore, the electronic controlling and regulating device 4 is supplied with hand brake 71 and foot brake 72 activation information and the output speed 73—possible from all drive wheels—from the vehicle 7. The vehicle's service brake, which may comprise both a generally known parking brake and also a hydrodynamic brake, is directly influenceable as well as influenceable through the controlling and regulating device, and consequently through the lead 44. For operation, the acceleration pedal 5 is connected through the control cable 51 and the deceleration pedal 6 through the control cables 61, 62 and the gear selection device 8 through the cable 81, with the electronic controlling and the regulating device 4.

FIG. 2 shows a control curve 52 that represents the acceleration a as a function of the actuation angle or the actuation path of the acceleration pedal 5.

In FIG. 3, the running resistance power P over the vehicle speed V is shown, with the curve LR representing the air and rolling resistance on flat terrain. The other, more weakly drawn curves LR1 to LR3 involve various climbing resistances and LR4 to LR6 show the displacement that results from a downhill run. Computational intervals that arise in an accelerated run on flat terrain, for example, are indicated with A.

FIG. 4 shows the greatly simplified functioning in the electronic controlling and regulating device 4. With the actuation of the acceleration pedal 5 and the deceleration pedal 6, the driver feeds the desired driving condition into the electronic controlling and regulating device 4. The power difference 45 in the time interval is calculated from the actual condition analysis that is made up of the revolutions per minute, cables 11, 21, 31 of the engine 1, clutch 2 and the transmission 3, as well as the engine load 12 and the gear-shift position 32 from the transmission 3 and the flow of signals from the vehicle 7 including the foot brake 72, hand brake 71, and output speed signals and the desired driving condition. Taking the pedal and vehicle dynamics into consideration, the gradient for the power change 46 is then extrapolated. The engine load and engine speed change 47 result from another calculation while taking a consumption optimum and the vehicle dynamic (frequency of shifting) into consideration.

In another calculation, the new transmission position 48 is calculated from the new engine speed. Then the signal output 49 for the influencing of the engine 41, influencing of the clutch 42 and influencing of the transmission 43 is produced.

In the engine characteristic diagram according to FIG. 5,

T = torque (NM)

nM = engine speed (1/min)

be = specific consumption (gKWh)

P = line-constant running resistance power (KW)

B = running resistance line of a first transmission multiplication

C = running resistance line of a second transmission multiplication $P_1$ = running resistance power before gear shifting $P_2$ = running resistance power after gear shifting The shifting process in shiftings of conventional automatic transmission is marked with the line $P_1$ to $P_2'$. As shown, the power in point $P_2'$ after shifting is less than before. Thus the driver must compensate for the power difference with the gas pedal. At the same time, automatic transmissions shifted in that way tend toward gear-shifting oscillation with unfavorable running resistances.

The shifting process with constant power is represented by the curve from $P_1$ to $P_2$. Since the electronic controlling and regulating mechanism knows the gear multiplication that is available, it selects the multiplication with which the most favorable consumption can be achieved at constant power, for example. Thus, gear shifting with the gear leap X is not carried out at constant torque, but the automatic transmission takes over the readjustment (range of adjustment Y) immediately after the shifting of gears. Thus, the correct engine load is fed in immediately after the engine engagement resulting from the gear shifting. As a result, the same power is available to the driver after the gear shifting. Thus he only needs to intervene when he would like to change his driving condition by further acceleration or deceleration.

The vehicle operating and speed-regulating device functions as follows:

The acceleration pedal 5 is actuated (i.e. depressed) by the driver as long as the driver would like to accelerate. The magnitude of the acceleration can be varied in each case according to the pedal angle. A possible example is derivable from the control curve 52 of FIG. 2.

Pedal angle is proportional to the acceleration, small angle means small acceleration, large angle means big acceleration.

This signal proportional to the actuation angle or path is conveyed to the electronic controlling and regulating device 4 through the control lead 51. If the desired speed is achieved, the driver eases off on the acceleration pedal. By that means, the engine load and, in connection with an automatic transmission 3, the multiplication, are accomodated to the changing running resistances by a vehicle speed regulating device, known in the art, that can be integrated in the electronic controlling and regulating device, but also can be provided separately. The adjustment of engine and transmission is selected according to a driving strategy—consumption-oriented, for example.

If the tempostat action is to be discontinued, the deceleration or brake pedal 6 is activated by the driver. In that connection, the pedal angles mentioned in the following are differentiated.

1. Very small angle—the tempostat action is discontinued by a signal on control lead 61 and at the same time the clutch 2 can be opened by the electronic controlling and regulating device through the control leads 42 or 43 or the transmission can also be put in neutral without an adjustment of the gear shift lever 8 being required. By that means, a free-wheeling effect is obtained that results in a reduction, or in the case of downhill an increase, of speed depending upon the driving profile or the running resistance in each case.

2. Small angle—the tempostat action is already discontinued by activation with a very small angle. The clutch is or has been closed and the transmission is or has been shifted into a gear corresponding to the driving speed so that an engine-braking action results. By that means, relatively high shift points for a reverse-gear shift can still become effective, so that the engine-braking action is reinforced.

3. Bigger angle—when a specified small actuation angle is exceeded, the service brake is activated. This can take place directly, but also through the electronic controlling and regulating device. When the vehicle is equipped with a device that prevents an overloading of the service brake, the deceleration pedal acts on the service brake through the electronic controlling and regulating device. Furthermore, combination with a wear-free hydrodynamic brake, or similar devices such as a brake energy storage device, for example, is possible. At least after exceeding the small actuation angle, the deceleration pedal functions in a manner similar to the acceleration pedal.

Deceleration pedal angle is proportional to the deceleration, where small angle yields smaller deceleration and a large angle yields bigger deceleration.

The deceleration pedal is actuated (i.e., depressed) until a desired decelerated speed is reached. After that, the speed is maintained again.

Thus, the automatic transmission calculates, according to the angle of the deceleration pedal 6, the brake energy required, beginning with only the running resistance through the engine brake action to the service brake. The function mentioned above in connection with the activation of the deceleration pedal could also be the same in connection with the acceleration pedal 5, in which case a brief tapping of the acceleration pedal could bring about the free-wheeling action, for example.

In the electronic controlling and regulating device 4, the acceleration selected by the driver is calculated constantly. When that is done, the required engine power during the acceleration phase is:

$$P = Pw + Pa$$

P = engine power
Pw = running resistance power
Pa = acceleration power

As power modification, the following results:
$$P_2 - P_1 = Pw2 - Pw1 + Pa2 - Pa1$$

As a result of very small time intervals, $$Pw2 = Pw1$$

can be assumed.
From
ti $Pa = m \cdot km \cdot a \cdot V$

M = mass
km = correction factor for rotation masses
a = acceleration
V = speed
the following results:

$$P_2 P_1 = m \cdot km \, (a2 \cdot V2 - a1 \cdot V1)$$

Depending upon vehicle type and accuracy required, m·km can be stipulated as vehicle-constant or calculated from the vehicle dynamic when bringing to speed.

The acceleration preset by the driver through the angle of the acceleration pedal is a theoretical preset quantity with no influence of running resistances taken into consideration. The acceleration that is set is a partial value of the maximum acceleration for the running resistance at that time corresponding to the pedal angle.

Furthermore, the possibility of carrying out a continuous adjustment of desired acceleration to the measured actual acceleration by a comparison exists.

Thus, the power required for the acceleration selected by the driver is calculated continuously. The optimal values for engine filling ratio and multiplication in the transmission can be determined by the electronic apparatus by simple selection criteria.

In constant travel and changing running resistances, the required power difference is also calculated and the optimum for engine load and transmission multiplication calculated according to appropriate selection criteria.

I claim:

1. Apparatus for controlling the acceleration and deceleration of a motor vehicle having an engine, an automatic transmission, a clutch coupling the engine with the transmission, and gas and brake pedals in order to optimize engine performance and to maintain a given vehicle speed established by operation of the pedals, comprising
    (a) means for continuously sensing the position of the brake pedal;
    (b) means for continuously sensing the position of the gas pedal;
    (c) means for continuously sensing the speed of the vehicle and the operating conditions of the engine, clutch, and transmission, respectively;
    (d) first means for continuously calculating a power difference, a gradient for power change and the engine load and speed change in accordance with the sensed positions of the brake and gas pedals and with the sensed vehicle speed and operating conditions of the engine, clutch and transmission;
    (e) second means for continuously calculating a transmission position in accordance with a new engine speed resulting from said calculation of engine speed; and
    (f) means for producing control signals delivered to the engine, clutch and transmission to control the operation thereof for acceleration and deceleration of the vehicle, whereby a desired vehicle speed is maintained.

2. Apparatus as defined in claim 1, wherein said second calculating means are further operated in accordance with the operating parameters of the engine.

3. Apparatus as defined in claim 2, wherein said engine operating parameters include fuel consumption, exhaust gas value, and load, whereby said control means may be used to automatically control vehicle performance while optimizing engine efficiency.

4. A method for controlling the acceleration and deceleration of a motor vehicle having an engine, an automatic transmission, clutch coupling the engine with the transmission, and gas and brake pedals in order to optimize engine performance and to maintain a given vehicle speed established by operation of the pedals, comprising the steps of
 (a) continuously sensing the position of the brake pedal;
 (b) continuously sensing the position of the gas pedal;
 (c) continuously sensing the speed of the vehicle and the operating conditions of the engine, clutch and transmission, respectively;
 (d) continuously calculating a power difference, a gradient for power change and the engine load and speed change in accordance with the sensed positions of the brake and gas pedals and with the sensed vehicle speed and operating conditions of the engine, clutch and transmission;
 (e) continuously calculating a transmission position in accordance with a new engine speed resulting from said calculation of engine speed; and
 (f) producing control signals delivered to the engine, clutch, and transmission to control the operation thereof for acceleration and deceleration of the vehicle, whereby a desired vehicle speed is maintained.

5. A method as defined in claim 4, wherein the difference in engine power output is calculated according to the following formula:

$$P_2 - P_1 = m \cdot km(a_2 \cdot V_2 - a_1 \cdot V_1)$$

wherein
 m = mass
 km = correction factor for rotation mass
 a = acceleration
 V = speed
 P = engine power 6. A method as defined in claim 5, wherein the calculation of required change in engine power is performed in accordance with the operating parameters of the engine.

7. A method as defined in claim 6, wherein said engine operating parameters include fuel consumption, exhaust gas value, and load, whereby vehicle performance is automatically controlled while optimizing engine efficiency.

* * * * *